(12) United States Patent
Biscomb

(10) Patent No.: US 6,283,710 B1
(45) Date of Patent: Sep. 4, 2001

(54) VERTICAL AXIS WIND TURBINE ROTOR HAVING SELF-FAIRING VANES

(76) Inventor: Lloyd I Biscomb, 4452 Burlington Pl. NW., Washington, DC (US) 20016-4422

( * ) Notice: Subject to any disclaimer, the term of this patent is extended or adjusted under 35 U.S.C. 154(b) by 0 days.

(21) Appl. No.: 09/551,556

(22) Filed: Apr. 18, 2000

Related U.S. Application Data

(63) Continuation-in-part of application No. 09/095,800, filed on Jun. 11, 1998, now abandoned.

(51) Int. Cl.⁷ ............................................. F03D 3/06
(52) U.S. Cl. ................ 416/132 B; 416/117; 416/197 A; 416/240; 416/244 R; 416/DIG. 6
(58) Field of Search ..................................... 416/117, 119, 416/132 A, 132 B, 197 A, 240, 244 R, 244 A, DIG. 6

(56) References Cited

U.S. PATENT DOCUMENTS

| | | | | |
|---|---|---|---|---|
| 1,036,109 | * | 8/1912 | Haslinger et al. ................. | 416/119 |
| 1,319,766 | * | 10/1919 | Gracey ................................ | 416/240 |
| 3,995,170 | * | 11/1976 | Graybill ........................... | 416/197 A |
| 4,130,380 | * | 12/1978 | Kaiser ............................... | 416/132 B |
| 4,134,708 | * | 1/1979 | Brauser et al. .................. | 416/132 B |
| 4,191,507 | * | 3/1980 | DeBerg ............................. | 416/197 A |
| 4,218,183 | * | 8/1980 | Dall-Winther ................... | 416/132 B |
| 4,293,279 | * | 10/1981 | Bolie ................................ | 416/197 A |
| 4,408,955 | * | 10/1983 | Wagle et al. ..................... | 416/132 B |
| 4,681,512 | * | 7/1987 | Barnard ........................... | 416/132 B |
| 4,684,817 | * | 8/1987 | Goldwater ....................... | 416/DIG. 6 |
| 5,083,902 | * | 1/1992 | Rhodes ............................ | 416/132 B |
| 5,299,913 | * | 4/1994 | Heidelberg ...................... | 416/197 A |

* cited by examiner

Primary Examiner—Christopher Verdier
(74) Attorney, Agent, or Firm—Pillsbury Winthrop LLP

(57) ABSTRACT

A vertical axis wind turbine rotor having self-fairing vanes wherein the center of pressure on each vane is coplanar with the journal for the hub of the turbine rotor.

10 Claims, 4 Drawing Sheets

VERTICAL AXIS WIND TURBINE ROTOR HAVING SELF-FAIRING VANES

This is a Continuation-in-Part of U.S. patent application Ser. No. 09/095,800, filed Jun. 11, 1998, now abandoned, which is hereby incorporated by reference in full.

BACKGROUND OF THE INVENTION

The present invention relates to a vertical axis wind turbine rotor having self-fairing vanes, and to a vane structure for such a turbine rotor, improving upon the wind turbine rotor and vane disclosed in the Barnard, U.S. Pat. No. 4,681,512, issued Jul. 21, 1987.

Referring to attached FIG. 1, Barnard discloses a wind turbine having a vertical shaft 2 and a mounting hub 4. The hub 4 is journalled for rotation in a selected direction of rotation R around the vertical longitudinal axis of the shaft. The hub 4 can be journalled on a base, on the shaft 2, or it can be fixedly attached to the shaft 2 and the shaft journalled on a base. A plurality of vanes 10a, 10b, 10c, 10d are disposed quadrantly on the hub 4. The vanes 10a, 10b, 10c, 10d each comprise a frame 12 and a flexible resilient sail 14 secured to the frame. The frame 12 of each of the vanes 10a, 10b, 10c, 10d is semi-elliptical in shape, and the sail 14 when full has the shape of a generally cylindrical segment defined by the two planes, one perpendicular to the axis of the cylinder and one at forty-five degrees (45°) to the axis, which intersect along the minor axis of the semi-elliptical frame and a diameter of the cylinder. As the hub 4 rotates in the selected direction of rotation R, the respective instantaneous direction of movement of each vane 10a, 10b, 10c, 10d around the axis of the shaft is shown by A, B, C, D. The wind direction is indicated by the arrow W, and numerals 24 and 26 respectively designate the head edge and the foot edge of the sail of a vane.

In the Barnard wind turbine rotor, the sail of each vane is in succession filled when being driven downwind, causing rotation of the hub or hub and shaft, thereby converting wind energy to rotation of structure. A power take-off can be operatively connected to the hub or shaft for performing work, i.e. driving a load. As each sail is, in turn, being driven upwind as the turbine rotor rotates, that sail becomes temporarily faired, i.e., it streams behind the respective vane frame, for diminishing drag. In Bamard, the vane frame shape said to be preferred is a semi-ellipse, i.e. one-half of the intersection of a plane cutting a right circular cylinder at a 45-degree angle to the longitudinal axis of the cylinder.

In the Barnard construction, the center of pressure of each of the vanes 10a, b, c, d is higher than the center of hub 4, thereby creating a rotational moment in the vertical plane through the hub, which applicant submits would contribute to excessive wear of the bearing mechanism (not illustrated) on which the hub 4 is journalled.

SUMMARY OF THE INVENTION

The present invention provides a vertical axis wind turbine rotor having self-fairing vanes wherein the center of pressure on each vane is coplanar with the journal for the hub of the turbine rotor, thereby improving on the wind turbine rotor disclosed in Barnard, by eliminating a source of excess wear in the hub journalling mechanism.

It is an object of this invention to provide a means for connecting the vanes and hub such that the required vane orientation is established thereby.

It is believed that the improvement provided by the present invention will enable construction of larger and more economical vertical axis wind turbines.

BRIEF DESCRIPTION OF THE DRAWINGS

Other features and advantages of the present invention will become apparent from the following detailed description of a typical embodiment thereof, taken in conjunction with the accompanying drawings, in which:

FIGS. 2a–c show top, front and right side views respectively of a modified Barnard vane of FIG. 2a according to the present invention;

DETAILED DESCRIPTION OF THE PREFERRED EMBODIMENTS

In FIGS. 2a–c and 3a and b, the elements whose functions and characteristics are conventional and well-known are shown by lines. The connections whose functions and characteristics are conventional and well-known (e.g., bolts, screws, welds, knots) are shown by dots. Detailed designs of these elements and connections are dependent on multiple engineering factors (e.g., site location, availability of local materials, economics, turbine rotor size and capacity, dynamic wind loading, ice loading where necessary, and strength of materials considerations), and are not addressed herein.

Conventional VAWT components other than those described herein for the rotor are not described in detail, including:

Means for lightning protection,

Means for furling the sails during destructive wind velocities,

A thrust bearing in the hub,

A load with or without a shaft connecting to or made integral with the hub, or thrust bearing, or both, A base, tower or pole supporting the hub, or the thrust bearing stator, or both.

Figure 1:
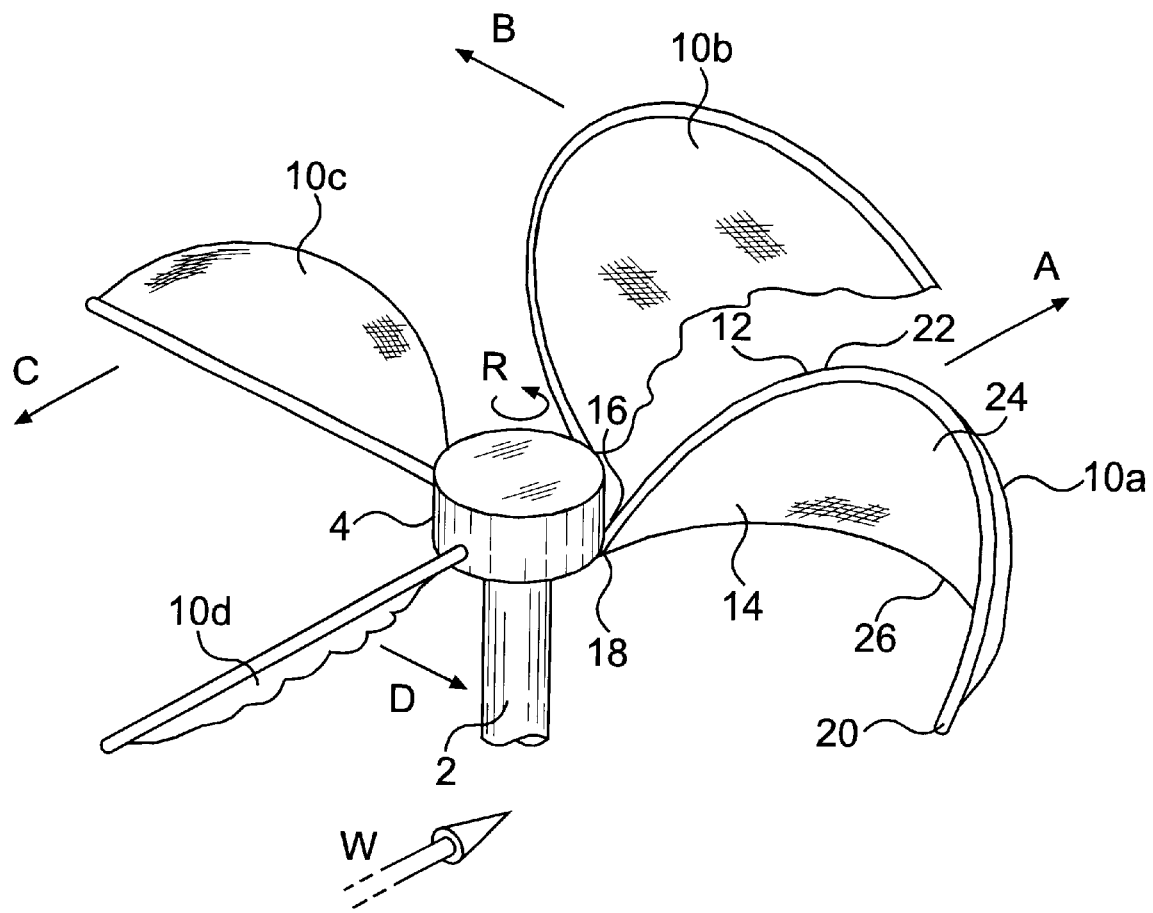
FIG. 1 is an isometric view of a prior art vertical axis wind turbine rotor (VAWT) disclosed in the above-identified Barnard document.

The structure shown in FIG. 1 has been described above, in the BACKGROUND section.

Figure 2A:
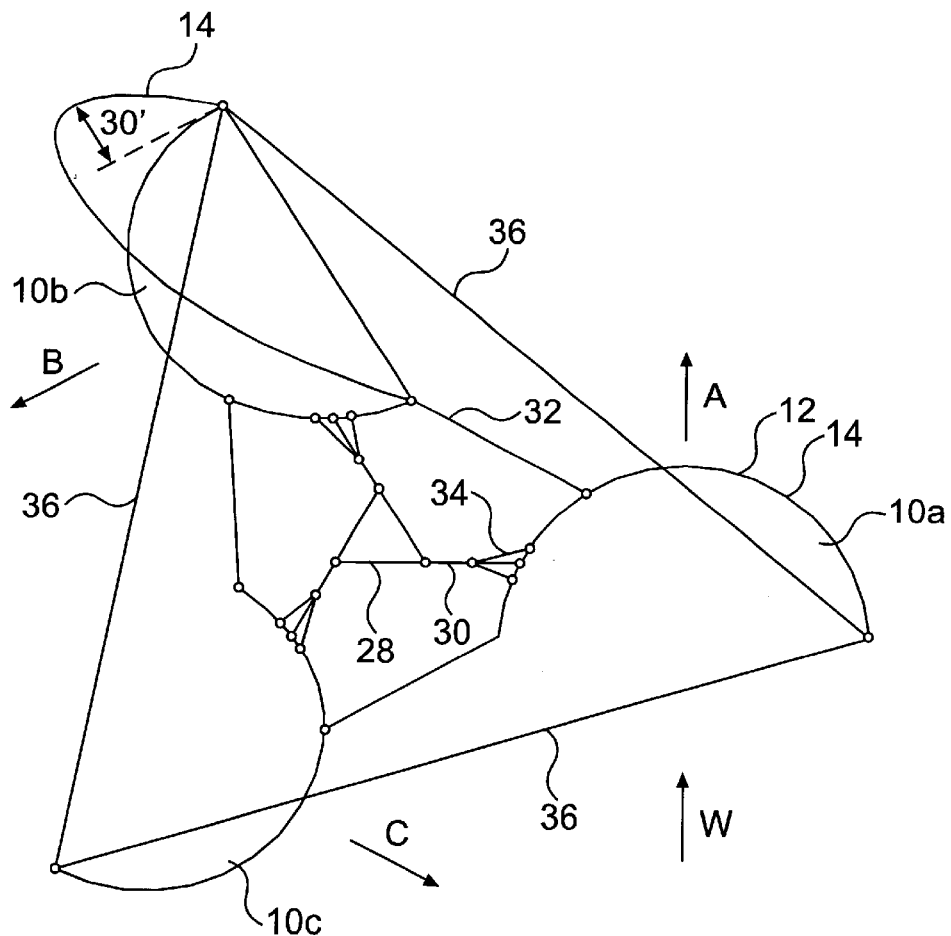
Figure 2B:
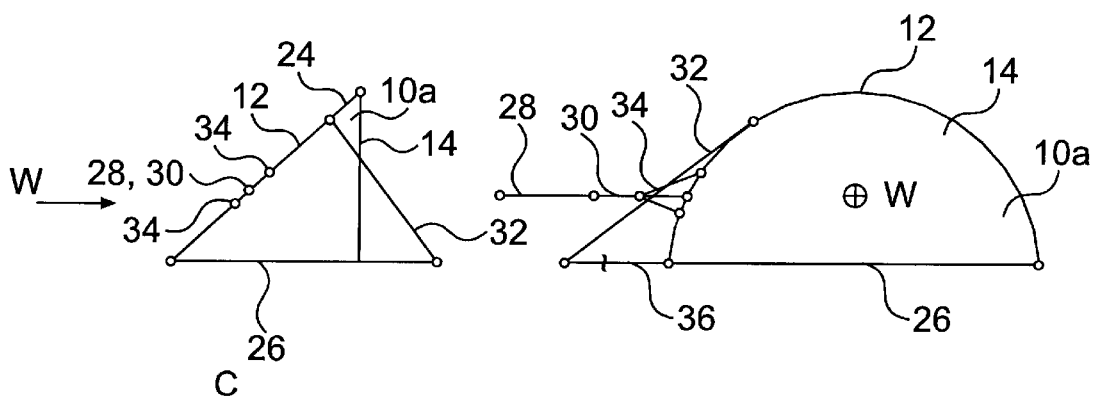

FIGS. 2a–c show top, front and right side views of a modified Barnard vane. Three or more such vanes are disposed equiangularly on the hub for a continuously rotating rotor. Each vane preferably has the same construction as is shown in the Figures, one being shown and described as an example for all. In FIG. 2, vane B is shown with the sail faired as if the wind were perpendicular to it, i.e., the vane is in the position downwind of the hub.

Making specific reference now to FIGS. 2a–c, the vane 10a is shown having a frame 12, the shape and spatial orientation of which together approximate the shape of the intersection of a notional vertically oriented right circular half-cylinder and a notional plane which intersects the longitudinal axis of the half-cylinder at a 45-degree angle.

This shape and spatial orientation is to ensure that the center of pressure of vane 10a is on a horizontal level with the center of the journalling mechanism in hub 4, thereby minimizing the moment tending to rotate vane 10a in the vertical plane about the hub 4. That moment would cause excessive bearing wear in the journalling mechanism, and in some designs for the journalling mechanism would cause the rotor and stator thereof to separate in high wind conditions. This should enable design of much larger and more economical vertical axis wind turbines than would the Barnard construction.

The shape of the sail 14 is defined by its head edge 24 which is attached to the frame 12, and its foot edge 26. The foot edge 26 extends continuously between the proximal and distal ends of frame 12 and is otherwise unattached thereto. The tilted orientation of frame 12 and the length of the foot edge 26 of the sail 14 is such that the sail 14 is full when moving with the wind and streams behind the frame 12 and has minimum drag when moving across and against the wind. The means for attaching the head edge 24 of the sail 14 to the frame 12 is subject to design choice and can be conventional (e.g., provided by lacing and grommets, tracks and slides, the sleeve described by Barnard, or some combination thereof). The sail 14 is preferably comprised of flexible, light-weight, resilient, substantially wind-resistant material (e.g., sail cloth fabric, such as canvass or nylon).

To determine the appropriate configuration of a rotor as shown in FIGS. 2a–c incorporating the vane of FIG. 1, according to the present invention, the following specific analysis will be provided by way of example:

FIG. 2a shows a top view of a wind turbine rotor using the modified Barnard vanes of FIG. 1, and the front and right side views of one vane of the rotor. This figure was used to derive graphically the lengths of structural members 30 and 32 of the rotor. Structural members 28 and 30, described separately, in practice would very likely be the two end sections of the same piece of stock.

Members 28 of each of the three vanes may connect to form an equilateral triangle in the center of the wind turbine rotor, and that triangle of members 28 rests on and is fastened to the hub 4, presumably a conventional thrust bearing rotor for the purpose of this description. The length of member 28 was arbitrarily chosen to equal one-half of the radius of the front view semi-circular projection of the elliptical frame 12, but that is a design option subject to influence by the thrust bearing radius and probably other factors. Connecting the members 28 to the thrust bearing rotor may be made by any conventional means, not necessarily in the triangular configuration shown here.

In contrast to a solid airfoil, a vane including a flexible sail can have the problem that when faired, the sail can come into contact with the hub 4, or other portions of the shaft 2. Thus, it is even more difficult to modify the Barnard vane by lowering the center of pressure because the problem of sail-to-hub contact is exacerbated as the point of connection moves further from the hub along the curve of the frame. There is no motivation in the prior art to modify the FIG. 1 sail in this manner.

In part to alleviate this problem, the present invention provides a member 30 of each vane which acts as a spacer between the frame 12 to prevent the sail 14 from touching the hub 4 while upwind of the hub 4. In FIG. 2, vane B is shown with the sail 14 faired as if the wind were perpendicular to it, i.e., the vane was in the position downwind of the hub 4. To obtain this depiction of the faired sail 14, the lengths of the faired sail 14 from the frame 12 in the plane of the frame 12 are transferred from the right side view of the frame 12 and sail 14 to the top view of that vane. The length of the structural member 30 between the frame 12 and the hub 4 is then obtained graphically from this figure, by adding an arbitrary length to that of the maximum horizontal distance of the faired sail 14 from frame 12 (denoted by reference numeral 30').

Member 30 may be connected to the frame 12 by means of a T-connector or similar conventional means 34, shown as a triangle, to strengthen that connection, and to act jointly in combination with member 32 (if used) to establish and maintain the 45 degree inclination of the frame 12. FIG. 3b shows the member 30 as a broken line, however as discussed above, the member 30 should be of sufficient length that the sail, when faired, does not come into contact with the hub. The connection point between the member 30 and the frame 12 is located such that the center of pressure $C_p$ is on the plane of the journalling mechanism in the hub 4. For example, one approximation of the vane shape which ensures this is that the front view of the area of the sail 14 is equally divided above and below the plane of the journalling mechanism in the hub 4.

At least one member 32 may be used to connect the frame 12 outwardly and downward to the lower end of the frame 12 next ahead in order of rotation. If member 32 is used, the connection point between frame 12 and member 32 should be close to the top of frame 12, to minimize interference with the sail 14. To minimize the cantilevered portion of frame 12 distal to that connection point, it could be made at or somewhat beyond the top of frame 12, with negligible effect on sail 14. The length of member 32 may be derived graphically from FIG. 2, such that it establishes and maintains the 45 degree inclination of the frame 12, in cooperation with structural support from a connector 34 between member 30 and the frame 12, as described above. The length of member 32 may be obtained by measuring the lengths of the top, front and right side views of member 32, squaring and summing those lengths, and taking the square root of that sum. Member 32, if used, is under compression continuously during rotation, with negligible tension, and that only during transients caused by wind gusts.

Alternatively, member 32 may be connected outwardly and downward to a wheel riding on the ground or in a track, below and ahead of the top of frame 12 (not shown). In that case, the connection between the frame 12 and the member 32 may be similar to the connection 34 and the connection between the member 32 and the wheel may be similar to a conventional bicycle fork.

The three lower distal ends of frame 12 may be connected by horizontal stabilizing lines 36, under continuous tension during rotation, for mutual support and to minimize transient effects of wind gusts, by damping of non-rotational transient frame motion.

Figure 3A:
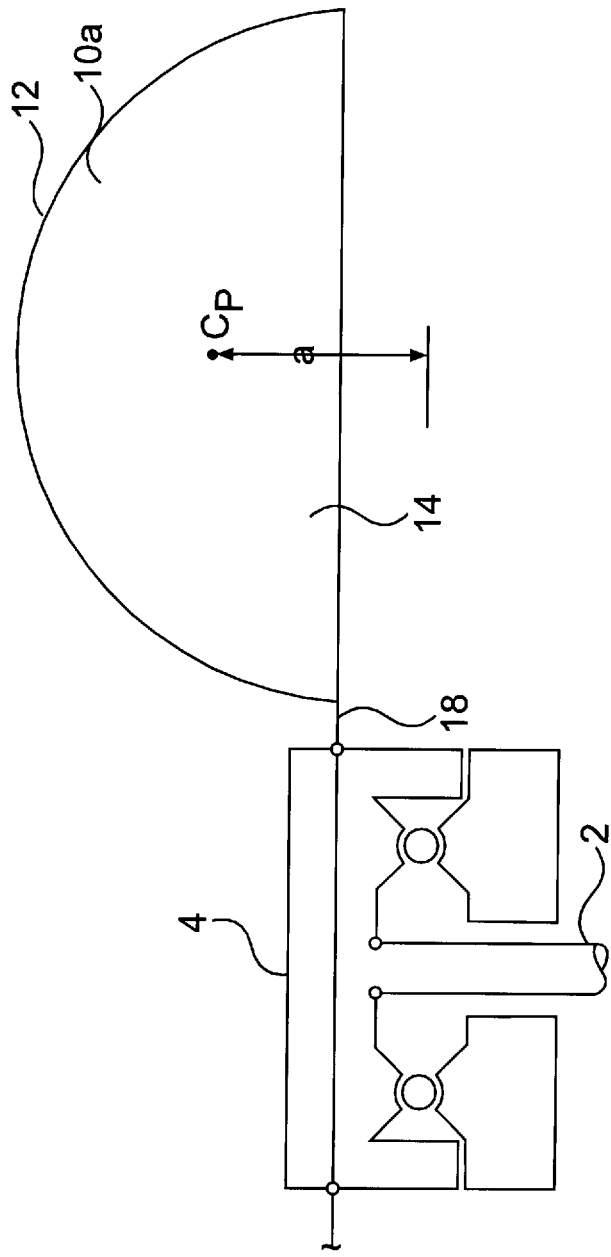
FIG. 3a shows a cross section of FIG. 1, illustrating a Barnard hub and vane.
Figure 3B:
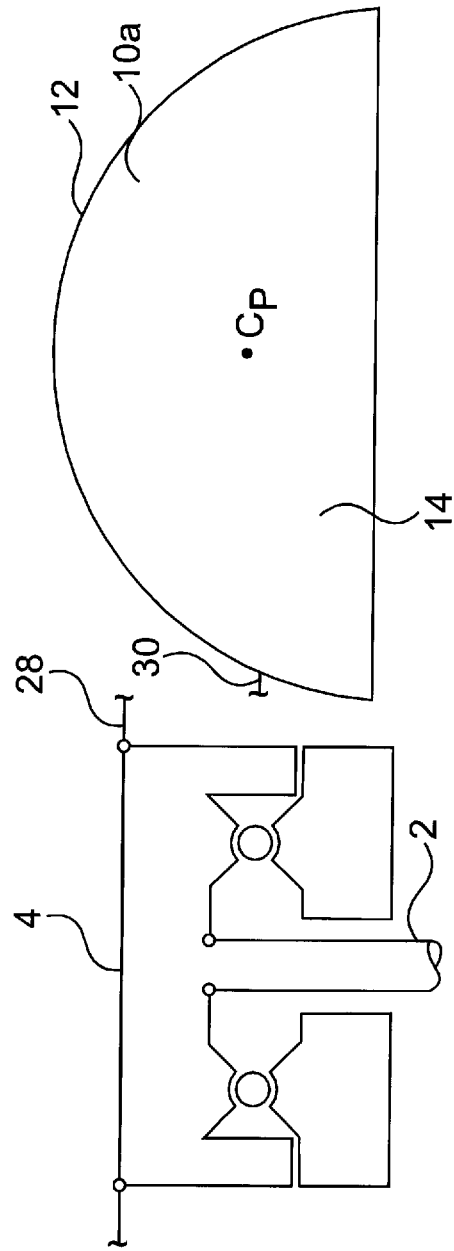
FIG. 3b shows a cross section of FIG. 2, illustrating a hub and vane in accordance with the present invention.

FIG. 3a shows, by means of a cross-section view of the hub 4 and a vane 10a (not to scale), that in FIG. 1 the horizontal plane of the center of pressure $C_p$ of vane 10a is above the horizontal plane of the journalling mechanism of hub 4 by the length a. The length a times the force of the wind on vane 10a is the moment tending to rotate the hub 4 rotor in the vertical plane of shaft 2. That moment would be sufficient to severely damage the journalling mechanism in the hub 4.

FIG. 3b shows a similar cross-section for a wind turbine rotor according to the present invention as illustrated in FIG. 2. The center of pressure $C_p$ of a vane 10a is in the horizontal plane of the journalling mechanism of the hub 4, i.e., the length a is zero. Thus, the moment tending to rotate the hub 4 rotor in the vertical plane of the shaft 2 is reduced to zero. In practice, the length a may be nearly zero rather than exactly zero, in which case, the moment is reduced to approximately zero.

Whatever residual torque remains tending to rotate the hub 4 in the vertical plane, caused by momentary fluctuations of center of pressure of the sail 14 above and below the horizontal plane of the hub 4, is then transmitted to the ground through the hub 4 stator and the supporting structure. In a preferred embodiment, the VAWT may be mounted directly on the ground at some sites, e.g., convex hilltops with suitable radii of curvature, with no intervening structure other than material such as concrete. This should eliminate any remaining torque in the vertical plane being transmitted through the load shaft to the load, which could damage the load.

The term "load shaft" as used herein may be interpreted as "load" in some cases, since it is possible to integrate the thrust bearing and the load, especially if the load is an electric generator or air compressor. Such an interpretation may apply to a water pump, or other energy conversion device, for example, as the load. For some loads, and some vane designs, the triangle of members 28 on hub 4 may be enlarged to include any or all of the length of members 30, with the only structure supporting the hub 4 being that required to connect the hub 4 and wheels running on the ground, in a concave circular trough, or on a rail. This would eliminate the need for a thrust bearing.

In FIGS. 4a–m, all of the vane configurations shown are examples of the general case in which the front view sail areas above and below the horizontal plane of the hub are equal. This configuration provides an approximation of a sail having the center of pressure $C_p$ on a plane of the hub as indicated in FIGS. 4a–m. The dotted line in each Figure denotes a plane, extending horizontally from the hub through the center of pressure of each exemplary sail. Note that the Figures are not necessarily to scale. FIGS. 4a–f show modified Barnard vanes with various rectangular, triangular and trapezoidal front view sail areas below the horizontal plane of the hub. FIG. 4g extends a modified Barnard vane horizontally and distally from the hub. FIGS. 4h–4j show rectangular frame vanes with rounded top corners that may be used to enhance a smooth transition of sail positions from filled to faired as the rotor rotates. FIGS. 4k–4m show rectangular frame vanes with diagonal top corners for the same purpose. As noted above, these Figures serve to illustrate the general point that the center of pressure must be determined for each particular configuration so that it may be properly positioned for use. The exact position of the center of pressure will, of course, vary depending on the particular sail configuration chosen. The modified Barnard vane configuration shown in FIG. 2 is explained by way of example, the details of the other embodiments following in a manner understood to one skilled in the art.

Figure 4:
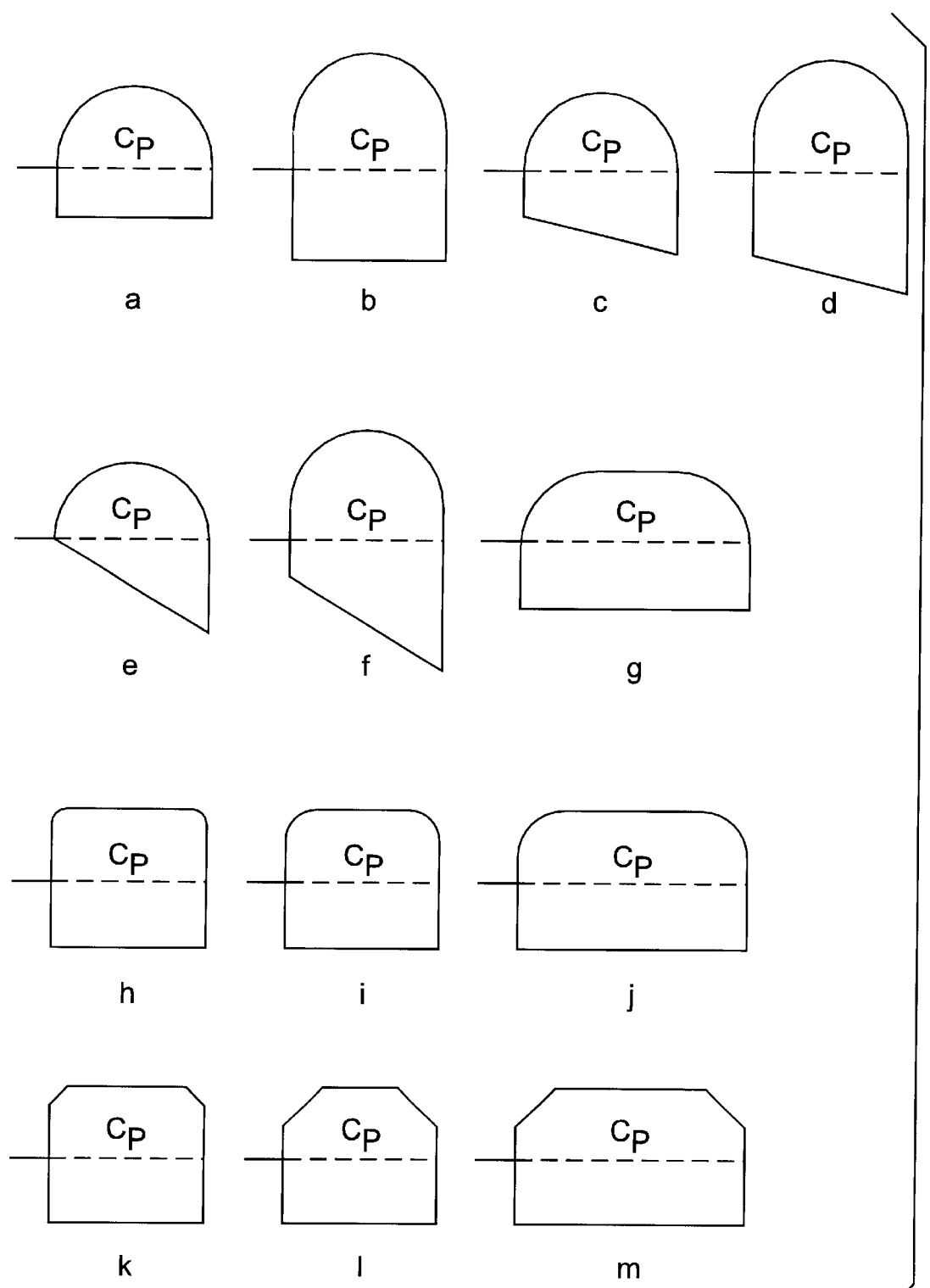
FIGS. 4a–m are a series of sketches showing various configurations of vanes that may be used in a rotor according to the present invention.

Generalizing the analysis to include the configurations shown in FIG. 4 (e.g., to obtain an optimum configuration according to selected criteria such as minimizing payback time) is not necessary to the understanding of the present invention. Site-specific engineering decisions may be influenced by multiple factors, some of which may influence the choice of vane configuration.

For large VAWT rotors, a conventional pole or comparable structure (not shown) may be mounted on top of the triangle of members 30 on the hub 4 rotor, with conventional support lines from the top of the pole or structure to the tops of frames 12, preferably tangentially, to minimize the effects of dynamic wind loading on the cantilevered weight of frames 12 distal to the intersection of frames 12 and member 32 (if used). This feature may not be required when that intersection is at or near the top of frame 12.

In conjunction with the device according to the present invention, it may be advantageous to make use of conventional additional components to provide lightning protection, or sail furling during destructive wind velocities, or both.

The above-described embodiments are intended to be illustrative, not restricting. The scope of the invention is defined by the claims, construed in accordance with established legal principles, and any and all equivalents are to be considered within the scope thereof.

What is claimed is:

1. A vertical axis wind turbine rotor, comprising:
    a turbine rotor supported at a given level on a support structure for wind-driven rotation in a selected direction about a vertical axis;
    a hub having a rotational axis substantially coinciding with said vertical axis;
    a plurality of vanes equiangularly distributed about said hub;
    structural members connecting said vanes with said hub such that as wind acts on said vanes in rotational succession, said hub is caused to rotate about said rotational axis;
    each of said vanes including a generally inclined planar outer frame including a top section and a bottom section extending generally outwardly, so as to have a proximal end located nearer to said hub and a distal end located further from said hub, with said top section rotationally leading said bottom section in said direction of rotation, said top and bottom sections constituting a substantially rigid frame structure, said frame structure being inclined at an angle of about 45 degrees relative to the instantaneous direction of movement of the respective frame as said turbine rotor rotates in said selected direction;
    each of said vanes further including a sail made of lightweight, resilient, substantially wind-resistant material having a head edge and a foot edge, said sail having said head edge and foot edge thereof respectively attached to the top and bottom sections of a respective said frame structure so as to be effectively spread within the respective frame to become full when facing and moving with the wind, and to collapse to a drag-minimizing shape when moving across and against and not facing the wind; and
    said vanes having respective centers of pressure which are all disposed substantially in a same substantially horizontal plane, which is substantially coplanar with said level at which said turbine rotor is supported for rotation on said support structure.

2. A vertical axis wind turbine rotor according to claim 1, wherein said plurality of vanes is constituted by three vanes.

3. A vertical axis wind turbine rotor according to claim 1, wherein said sail is sufficiently large in area relative to the respective said frame which supports that sail, that when that sail is full, a portion thereof located adjacent the top section of the respective frame is disposed substantially perpendicular to the instantaneous direction of movement of the respective frame as the turbine rotor rotates in said selected direction.

4. A vertical axis wind turbine rotor according to claim 1, wherein structural members connect each of said vanes to a vane preceding in the direction of rotation.

5. A vertical axis wind turbine rotor according to claim 4, wherein said structural members connecting said vanes with said hub and the structural members connecting said vanes with said preceding vane jointly establish said approximately 45 degree angle at which said frame structure is inclined.

6. A vertical axis wind turbine rotor according to claim 1, wherein said planar frames are generally elliptical in shape.

7. A vertical axis wind turbine rotor according to claim 1, wherein said planar frames are generally rectangular in shape.

8. A vertical axis wind turbine rotor according to claim 1, wherein said planar frames or portions thereof are generally triangular in shape.

9. A vertical axis wind turbine rotor according to claim 1, wherein said planar frames are generally a combination of elliptical, rectangular and triangular shapes.

10. A vertical axis wind turbine rotor, comprising:

a turbine rotor supported at a given level on a support structure for wind-driven rotation in a selected direction about a vertical axis;

a hub having a rotational axis substantially coinciding with said vertical axis;

a plurality of vanes equiangularly distributed about said hub;

structural members connecting said vanes with said hub such that as wind acts on said vanes in rotational succession, said hub is caused to rotate about said rotational axis;

structural members connecting each of said vanes to a vane preceding in the direction of rotation;

each of said vanes including a generally inclined planar outer frame including a top section and a bottom section extending generally outwardly, so as to have a proximal end located nearer to said hub and a distal end located further from said hub, with said top section rotationally leading said bottom section in said direction of rotation, said top and bottom sections constituting a substantially rigid frame structure, said frame structure being inclined at an angle of about 45 degrees relative to the instantaneous direction of movement of the respective frame as said turbine rotor rotates in said selected direction, the structural members connecting said vanes with said hub and with said preceding vane cooperating to establish said approximately 45 degree angle at which said frame structure is inclined;

each of said vanes further including a sail made of lightweight, resilient, substantially wind-resistant material having a head edge and a foot edge; said sail having said head edge and foot edge thereof respectively attached to the top and bottom sections of a respective said frame structure so as to be effectively spread within the respective frame to become full when facing and moving with the wind, and to collapse to a drag-minimizing shape when moving across and against and not facing the wind; and said vanes having respective centers of pressure which are all disposed substantially in a same substantially horizontal plane, which is substantially coplanar with said level at which said turbine rotor is supported for rotation on said support structure.

* * * * *